United States Patent
Graham, Sr.

(10) Patent No.: US 7,315,093 B2
(45) Date of Patent: Jan. 1, 2008

(54) WIND TURBINE SYSTEM FOR BUILDINGS

(76) Inventor: John F. Graham, Sr., 6836 Bee Caves Rd., Suite 204, Austin, TX (US) 78746

( * ) Notice: Subject to any disclaimer, the term of this patent is extended or adjusted under 35 U.S.C. 154(b) by 0 days.

(21) Appl. No.: 11/379,089

(22) Filed: Apr. 18, 2006

(65) Prior Publication Data

US 2007/0176431 A1     Aug. 2, 2007

Related U.S. Application Data

(60) Provisional application No. 60/763,615, filed on Jan. 31, 2006.

(51) Int. Cl.
*F03D 9/00* (2006.01)
(52) U.S. Cl. ............................. 290/55; 290/44
(58) Field of Classification Search ................. 290/55
See application file for complete search history.

(56) References Cited

U.S. PATENT DOCUMENTS

| | | | | |
|---|---|---|---|---|
| 3,956,902 | A * | 5/1976 | Fields, Jr. ................. | 62/3.3 |
| 4,019,828 | A * | 4/1977 | Bunzer ..................... | 416/55 |
| 6,590,363 | B2 * | 7/2003 | Teramoto .................. | 320/101 |
| 7,084,520 | B2 * | 8/2006 | Zambrano et al. ......... | 290/44 |
| 7,276,809 | B2 * | 10/2007 | Zambrano et al. ......... | 290/55 |
| 2005/0242590 | A1 * | 11/2005 | Zambrano et al. ......... | 290/44 |
| 2006/0037319 | A1 * | 2/2006 | Kaufman .................. | 60/651 |
| 2006/0140748 | A1 * | 6/2006 | Raziel ..................... | 415/4.1 |
| 2006/0170222 | A1 * | 8/2006 | Zambrano et al. ......... | 290/55 |
| 2007/0018462 | A1 * | 1/2007 | Richards et al. .......... | 290/55 |

FOREIGN PATENT DOCUMENTS

| | | | | |
|---|---|---|---|---|
| GB | 2404700 | A | * | 2/2005 |
| JP | 2001153025 | A | * | 6/2001 |
| JP | 2001193631 | A | * | 7/2001 |
| JP | 2005207288 | A | * | 8/2005 |

* cited by examiner

*Primary Examiner*—Joseph Waks
(74) *Attorney, Agent, or Firm*—Law Offices of Mark L. Berrier

(57) ABSTRACT

Systems and methods for capturing the energy of wind currents by placing wind-driven turbines at one or more edges of a building's roof, where the wind currents are concentrated by deflection of the wind off the horizontal faces of the building. In one embodiment, a cylindrical wind turbine is placed at the edge of a building's rooftop. The turbine structure drives an electrical generator. The axis of rotation of the turbine is parallel to the ground and to the edge of the building. A concentrator may be used to direct rising winds into the turbine. Turbines can be installed on multiple sides of the building to optimize the system for variations in wind direction with changes in seasons or weather conditions.

6 Claims, 5 Drawing Sheets

WIND TURBINE SYSTEM FOR BUILDINGS

RELATED APPLICATIONS

This application claims the benefit of U.S. Provisional Patent Application Ser. No. 60/763,615 by John F. Graham, filed Jan. 31, 2006, which is hereby incorporated by reference as if set forth herein in its entirety.

BACKGROUND

1. Field of the Invention

The invention relates generally to wind turbines, and more particularly to systems and methods for positioning wind turbines at the edges of building roofs in order to utilize concentrated wind flow at the edge of the roof for purposes such as electricity generation.

2. Related Art

Wind turbines of many types have been used to generate electricity in a variety of ways. The prior art describes turbines in a variety of locations including natural ridgelines, open fields, mesas and on ships. Recent design concepts for rebuilding the World Trade Center showed plans to incorporate wind turbines in that structure to harness the electrical generating power of passing winds. These turbines for generating electricity take many forms including the following:

Horizontal Axis Turbines (traditional-looking windmills) operate with fan-like rotors that look like airplane propellers that face into or away from the wind. The Horizontal Axis Turbine is the most common turbine configuration used today.

The Darrieus Turbine which looks roughly cylindrical, with wind-catching blades that span the length of the cylinder often described as looking like an egg beater. This vertical axis turbine has vertical blades that rotate into and out of the wind, the blades are placed roughly parallel in an arc to the axis. Guy cables are usually used to keep the turbine erect. In addition to keeping the turbine erect, the cables impose a large thrust loading on the main turbine bearings, causing increased wear on the bearings. With this type of turbine, replacing main bearings requires that the turbine be taken down. The Darrieus was invented in the 1920's and is not widely used today.

The Darrieus Turbine is also related to machines with straight vertical axis blades called Giromills or cycloturbines which use a wind vane to mechanically orient a blade pitch change mechanism. They were designed to be mounted on a tower or other device. The cylcoturbine was marketed commercially for several years, but never progressed beyond the research stage.

The Savonius Turbine is S-shaped if viewed from above. The turbine turns relatively slowly, but yields high torque. It has been proven useful for pumping water and other tasks, but its slow rotational speeds have not been proven to generate electricity cost effectively from wind power.

The present types of turbines in commercial use are generally deployed in open fields or mesas, as far from wind-slowing obstructions as possible to allow wind to strike their airfoils or blades at maximum speed. They are raised above the ground as much as possible to bring the airfoils away from wind-slowing ground effects.

Augmentors or concentrators have also been developed to try to concentrate wind onto the turbines, but they have not been proven to be economically successful in commercial use.

SUMMARY OF THE INVENTION

This disclosure is directed to systems and methods for using wind turbines that solve one or more of the problems discussed above. One embodiment comprises a system for capturing the energy of wind currents by placing wind-driven turbines at one or more edges of a building's roof, where the wind currents are concentrated by deflection of the wind off the vertical faces of the building.

In one embodiment, a power-generating wind turbine structure is placed at (on or near) the edge of a building's rooftop. The device may employ a variety of different turbine styles, including straight-wing or cylindrical types (as will be described in more detail below,) propeller-style, or any other type. The axis of rotation is parallel to the ground and parallel to the edge of the building. The placement of the turbine structure near the edge of the building allows it to use the building wall as a passive concentrator to funnel wind up the face of the building and into the turbine structure. A concentrator may be used to help catch and direct rising winds into the turbine. Turbines can be installed on multiple sides of the building to optimize the system for variations in wind direction with changes in seasons or weather conditions.

In one embodiment, the wind turbine has a cylindrical turbine structure, and the turbine is oriented with its axis parallel to the edge of the roof. The wind turbine may be positioned adjacent to a parapet wall, so that the parapet wall screens at least a portion of the negative wind flow from the turbine as the blades rotate. A deflector may be attached to the parapet wall or the turbine itself to redirect the concentrated wind flow toward a desired portion of the wind turbine to increase efficiency. In one embodiment, the wind turbine is coupled to a generator which generates electricity when driven by the wind turbine. The system may include a concentrator to redirect wind flow over the edge of the roof to a desired portion of the wind turbine. The concentrator may be adjustably positioned to enhance or spoil wind flow to the wind turbine. The system may also include solar cells mounted on the concentrator and configured to generate electricity from sun light contacting them. The system may further include a deflector positioned on the side of the wind turbine opposite the edge of the roof to redirect wind flow originating opposite the edge of the roof to a desired portion of the wind turbine enabling the turbine to utilize the wind from multiple directions.

Yet another embodiment comprises a method including providing a wind turbine, mounting the turbine on a roof of a building, and positioning the turbine at the edge of the roof within wind flow which is passively concentrated by the vertical face of the building and flows up and over the edge of the roof. The method may further include concentrating or spoiling the flow of wind onto the wind turbine, driving a generator with the wind turbine to generate electricity, and coupling the wind turbine to a set of solar cells to generate electricity in the absence of wind, among other things.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1A:
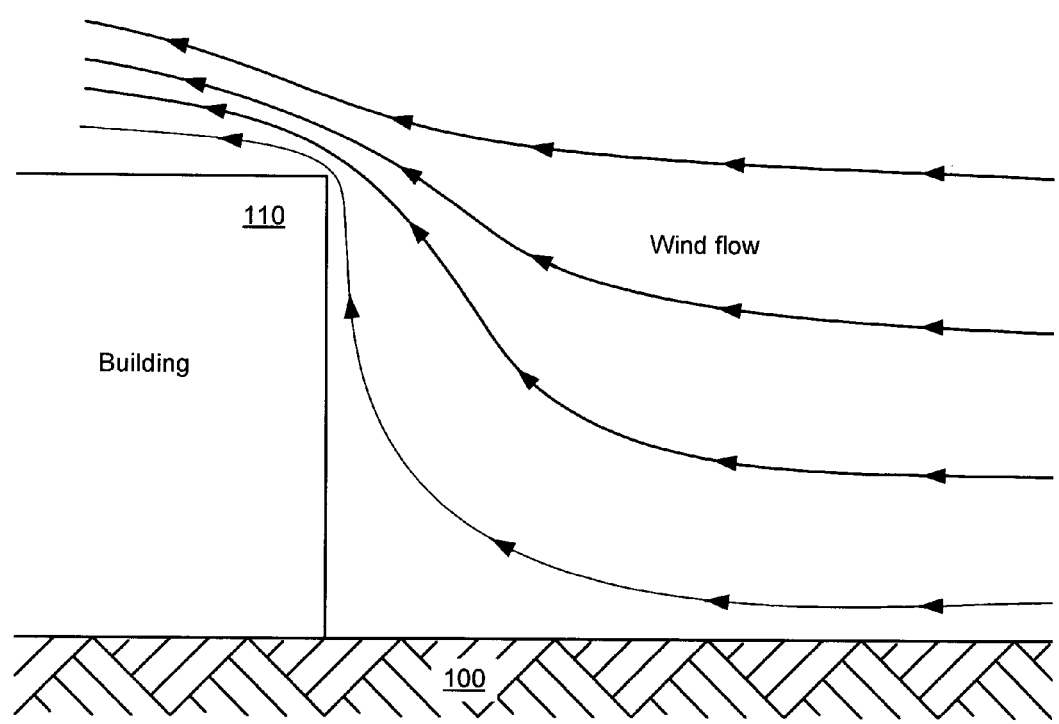
FIGS. 1A and 1B are diagrams illustrating wind flow over a building.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for capturing the energy of wind currents by placing wind-driven turbines at one or more edges or the perimeter of a building's roof, where the wind currents are concentrated by deflection of the wind off the vertical faces of the building.

In one embodiment, an energy generation system makes use of a cylindrical turbine having multiple blades that are parallel to the axis (axis of rotation) of the turbine. The turbine is positioned on the roof of a building, near the edge of the roof on its perimeter. The turbine is oriented horizontally, with its axis parallel to the edge of the roof. In this embodiment, a parapet wall extends upward from the edge of the roof. The turbine is positioned behind the parapet, with the axis of the turbine at roughly the same height as the top of the parapet, so that the wind coming over the parapet hits the upper portion of the turbine and pushes the turbine blades away from the edge of the roof. The lower portion of the turbine is shielded from the wind so that the wind (air eddies) does not push against the turbine blades as they rotate back toward the edge of the roof.

As the wind pushes the blades of the turbine, the blades rotate on a shaft that is on the axis of the turbine. In this embodiment, a pulley (or gear) is attached to the turbine shaft so that it rotates with the shaft. The pulley drives a belt or chain that in turn drives a generator or alternator. The generator produces electrical current that can be used to power electrical circuits in the building and/or to recharge batteries that can store the energy for later use. This embodiment also includes a wind concentrator that redirects additional airflow into the turbine. The concentrator may be designed to act as a spoiler when the wind speed at the turbine is too high, to redirect the flow of wind currents approaching the turbine from the roof (rather than the side of the building,) or to employ solar cells to generate additional electricity.

Referring to FIG. 1A, a diagram illustrating wind flow over a building is shown. In this figure, the wind is blowing from the right side of the figure to the left side of the figure. The wind is represented by the lines with the arrowheads. It can be seen that the wind is blowing generally from the right side of the figure to the left side of the figure (as indicated by the direction of the arrowheads. As the wind enters the right side of the figure, there are no obstructions above the ground (100,) so the wind direction is essentially horizontal. As the wind approaches building 110 and parapet wall (120) if present, it is deflected, since it cannot flow through the building. The wind can only flow upward and over the building, or around the building. FIG. 1A shows that the wind which is blocked by the building turns upward. The wind which is not blocked by the building continues to flow essentially horizontally. This essentially funnels the wind through a relatively narrow space at the edge of the roof. This effectively concentrates the wind currents at the edge of the roof and causes the wind speed to be higher at this point than at an open and unobstructed point on the ground.

Figure 1B:
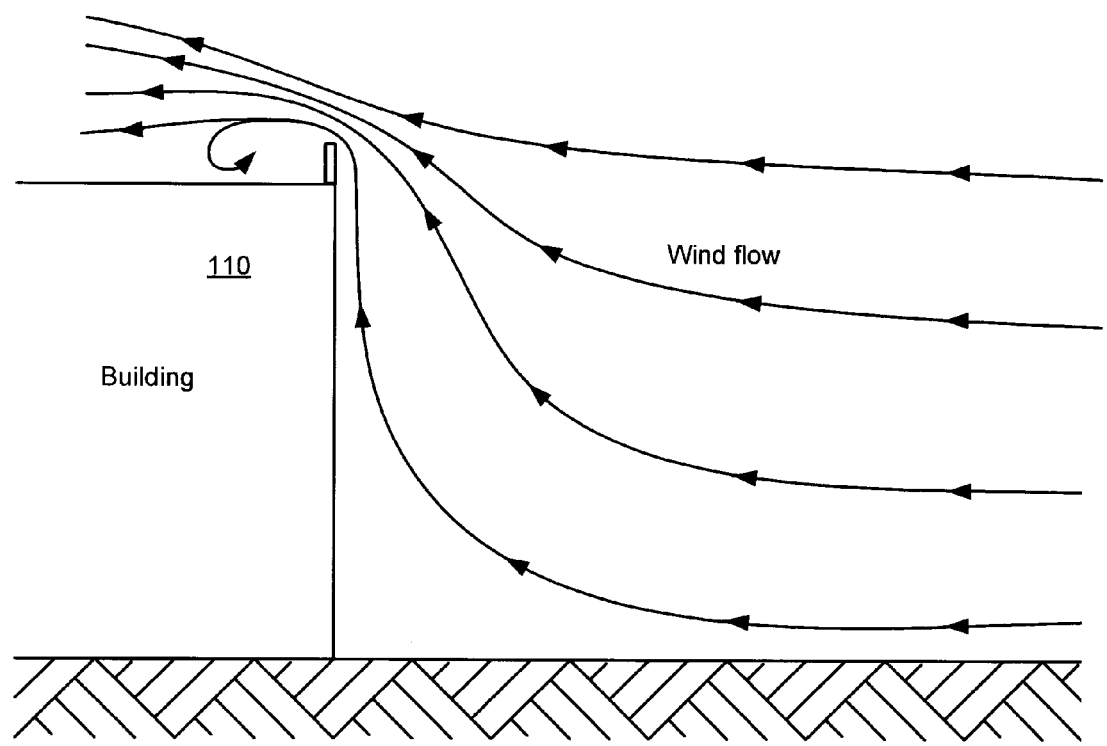

It should also be noted that, when there is a parapet wall, the wind creates a vortex or circular motion at a certain distance from the parapet wall depending on its height. The higher the parapet wall, the further the circular motion would be from the wall. Then the wind can begin to flow naturally horizontally again. This effect is shown in FIG. 1B. The positioning of the turbine structure may be positioned to take advantage of the circular motion of the wind caused by the parapet wall.

Figure 2:
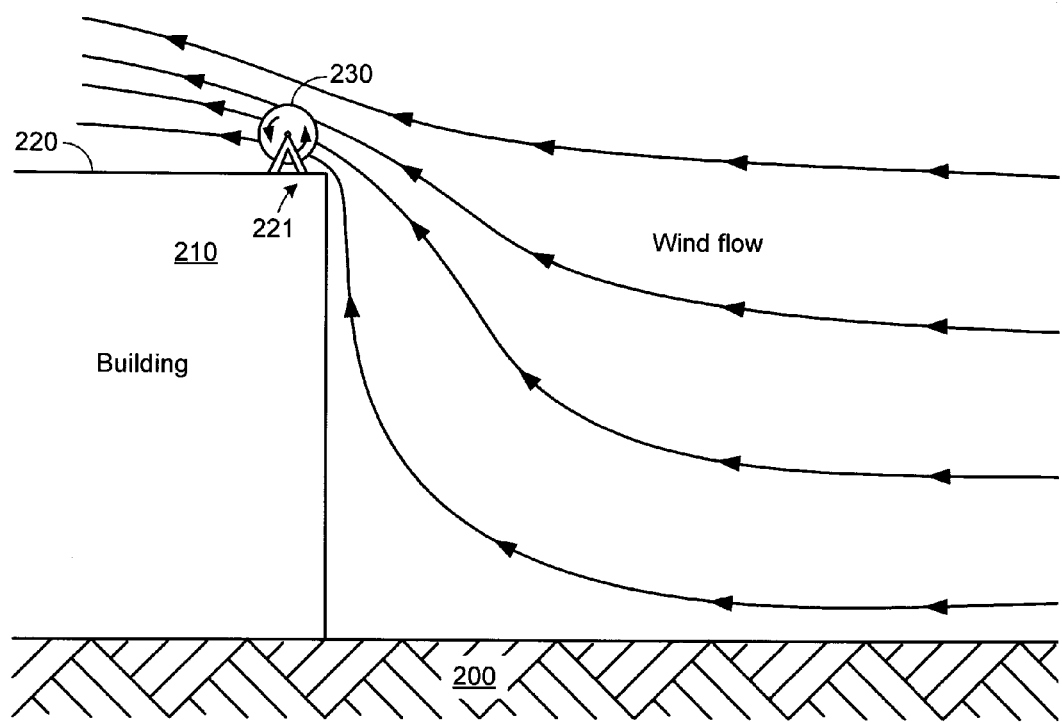
FIG. 2 is a diagram illustrating the positioning of the wind turbine at the edge of a building to take advantage of the concentrated wind flow in accordance with one embodiment.

Referring to FIG. 2, a diagram illustrating the positioning of the wind turbine at the edge of a building to take advantage of the concentrated wind flow at this point is shown. Again, the wind is shown flowing from the right side of the figure to the left side of the figure, where it is deflected by building 210, causing it to the concentrated at the edge 221 of the roof 220. Wind turbine structure 230 is placed at the edge of the roof, where the concentrated wind flow can drive the turbine.

In this embodiment, wind turbine 230 has a cylindrical structure. (FIG. 2 shows the end of wind turbine 230—the length of the wind turbine extends into the page.) The axis of wind turbine 230 (around which the turbine blades are driven by the wind) is parallel to edge 221 of roof 220. As indicated in figure, the blades of wind turbine 230 are driven in a counterclockwise direction by the flow of the wind, which in this embodiment is stronger across the top of the turbine structure. The length of the cylindrical structure of wind turbine 230 will typically be determined by practical design considerations, but one or more turbines may extend along the edge of the roof. If more than a single wind turbine is used, the turbines may be mechanically coupled to each other, or they may operate independently.

Figure 3:
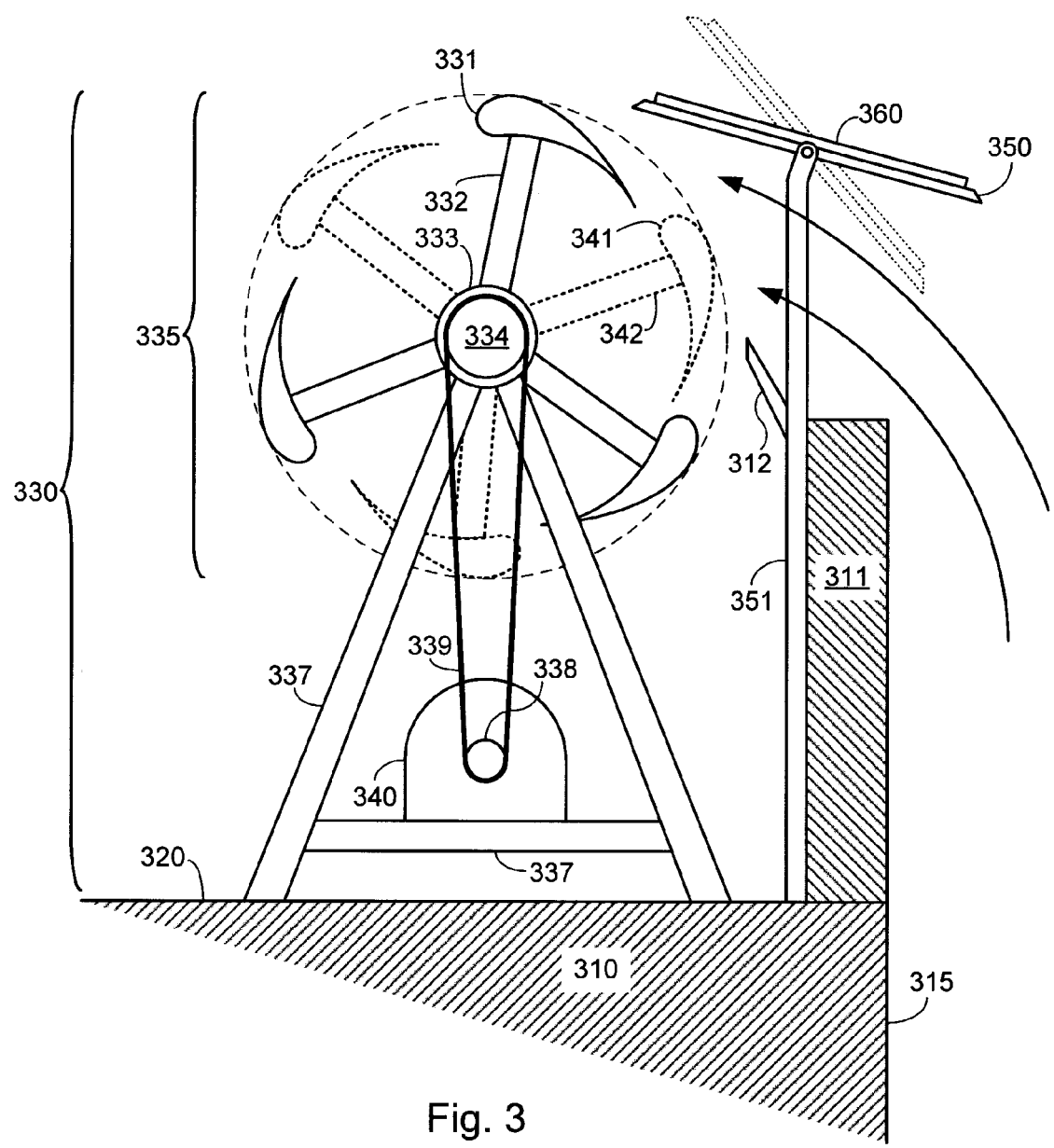
FIG. 3 is a detailed diagram illustrating the structure of a wind turbine system in accordance with one embodiment.

Referring to FIG. 3, a more detailed diagram illustrating the structure of a wind turbine system in accordance with one embodiment is shown. In this figure, wind turbine structure 330 is positioned at the edge of roof 320 of building 310. It should be noted that references to the "edge" of the roof should be broadly construed to include positions which are not only at the junction of the horizontal roof 320 and vertical face 315 of building 310, but also positions which are sufficiently close to this junction to place the blades or paddles of the turbine structure at least partially within the concentrated wind flow which comes over the edge of the building.

In this embodiment, wind turbine structure 330 includes a turbine portion 335 and a support structure 336. As depicted in the FIG. 3, turbine portion 335 has a cylindrical structure including a set of blades (e.g. 331) which are supported by arms (e.g. 332) that are connected to a central hub 333. Hub 333 rotates around an axle at the axis of the cylindrical structure, thereby allowing the turbine blades to rotate around this axis as well. The axle is held by support structure 336 which, in this embodiment, consists of a simple "A"-shaped frame. Support structure 336 maintains the positioning of turbine portion 335 with respect to the wind flow over the edge of the building (as indicated by the arrows.)

It should be noted that in one embodiment, turbine portion 335 includes two sets of blades that are offset from each other, both along the axis of the turbine and angularly. For instance, referring to FIG. 3. one embodiment employs a turbine portion 335 which is eight feet long (into the page in the figure.) A first set of three blades and supporting arms (e.g., 331 and 332) are shown using solid lines. Each of these blades is four feet long and therefore extends along half the length of turbine portion 335. A second set of three blades and supporting arms (e.g., 341 and 342) are shown using dotted lines. Each of these blades is also four feet long, but they are positioned on the other half of turbine portion 335. Since the two sets of turbine blades are positioned on different halves of turbine portion 335, the blades of the each set do not block the wind to the blades of the other set. Further, since the sets of blades are angularly offset (by 60 degrees in the figure,) the blades of one of the two sets will be more optimally positioned to catch the wind and restart the spinning of the turbine after it stops.

Support structure 336 also includes a cross-brace 337 which serves both to stiffen the support structure and to provide a mounting point for a generator 340. Pulleys 334 and 338 are provided on the turbine portion 335 and generator 340, respectively. A belt 339 couples the two pulleys so that when turbine portion 335 (including pulley 334) rotates, this drives belt 339 which in turn rotates pulley 338, thereby driving the generator and causing it to generate electricity.

Support structure 336 also includes a cross-brace 337 which serves both to stiffen the support structure and to provide a mounting point for a generator 340. Structure 337 may also have a component to adjust the entire turbine's position—this would enable the turbine to maximize the winds continual change in direction. Pulleys 334 and 338 are provided on the turbine portion 335 and generator 340, respectively. A belt 339 couples the two pulleys so that when turbine portion 335 (including pulley 334) rotates, this drives belt 339 which in turn rotates pulley 338, thereby driving the generator and causing it to generate electricity.

Also shown in FIG. 3 is a concentrator 350. Concentrator 350 is mounted on a concentrator support 351 which can be mounted to parapet wall 311. Concentrator 350 is used to redirect and concentrate the wind flow toward turbine portion 335. Concentrator 350 is an optional component of the system which may be helpful when the normal wind flow would otherwise be more vertical (so that it would miss turbine portion 335.) Alternatively, concentrator 350 may allow the wind flow to be redirected so that turbine portion 335 can be positioned slightly farther only from the edge of the roof, making the installation of the system less obvious and more aesthetically pleasing.

As depicted in FIG. 3, concentrator 350 is adjustable. A second position of concentrator 350 is shown by the dotted lines in the figure. It may be desirable to adjust to the position of concentrator 350 to optimize the wind flow across turbine portion 335. Concentrator 350 may also be used to spoil the wind flow if the wind speed becomes too high. In other words, if the wind flow is sufficiently high that the turbine structure may be damaged, concentrator 350 may be positioned to block, or spoil, the excess wind flow. The position of concentrator 350 may be manually or automatically adjustable. Another enhancement to concentrator 350 is the placement of solar cells 360 on the upper surface of the concentrator. Solar cells 360 may augment the electricity generated by the turbine system, and may even provide the only source of electricity if the wind flow across turbine portion 335 is insufficient to drive the system.

Figure 4:
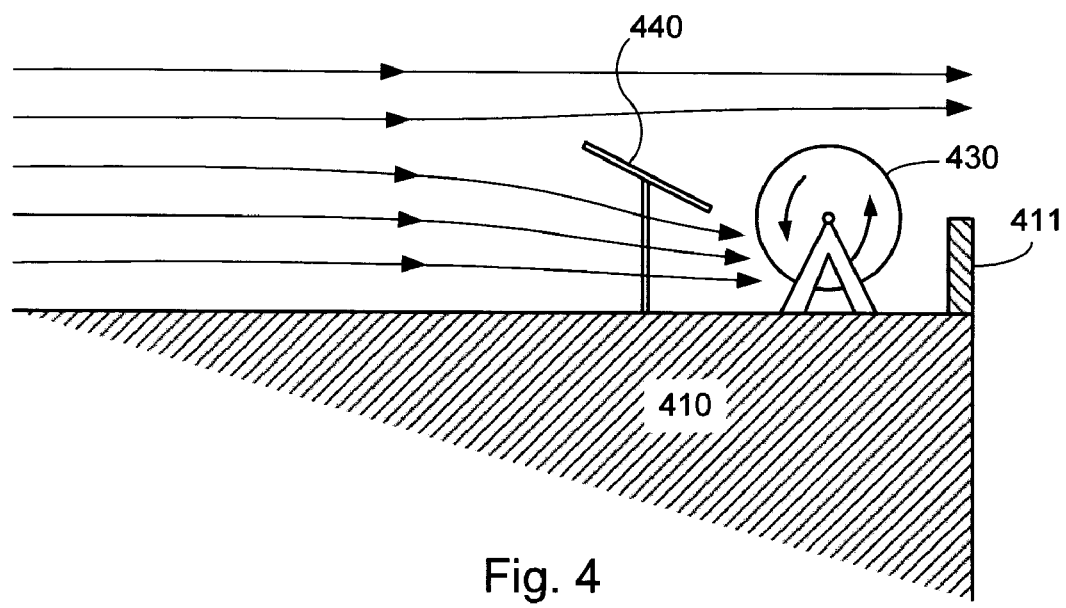
FIG. 4 is a diagram illustrating a reverse-wind-flow deflector as used in one embodiment.

Referring to FIG. 4, a diagram illustrating a reverse-wind-flow deflector as used in one embodiment is shown. In this embodiment, wind turbine structure 430 is again shown mounted at the edge of a building 410. In this figure, however, the wind is depicted as flowing from left to right. In other words, the wind is not blowing over the parapet wall 411 at the edge of the building, but is instead coming across the rooftop. While the turbine portion of the wind turbine structure is designed to rotate in the same direction (counterclockwise in the figure,) regardless of the direction from which the wind strikes it, a reverse-wind-flow deflector 440 is positioned to the left of wind turbine structure 430 and is oriented so that wind hitting the deflector is directed to the lower half of the turbine portion. Deflector 440 thereby concentrates the wind on the lower half, where it can push the turbine blades, and reduces the wind hitting the upper half, where it would resist the (counterclockwise) rotation of the turbine blades.

The foregoing description corresponds to an exemplary embodiment. It is contemplated that many variations of the features described above, as well as others which are not explicitly described, may be possible in alternative embodiments. Some of these variations will be described briefly below. These variations will be apparent to persons of ordinary skill in the field of the invention upon reading the present disclosure, and are believed to be within the scope of the appended claims.

In the exemplary embodiment described above, the turbine structure is placed near the edge of the building. The structure does not require a parapet wall but if one exists, the turbine structure may be mounted on the top of the parapet or the inside or outside edge of the parapet wall or on the roof of the building behind the parapet. As noted above, the turbine structure can be mounted on the roof away from the vertical face of the building to facilitate installation or to reduce the aesthetic impact of the installation. The wind will still be used to drive the turbine through proper placement of the system and through the use of a concentrator or augmentor. The position of the turbine structure can be adjusted by means of various types of mounting brackets, the use of various mounting holes in the brackets, and so on to allow positioning that is optimal for the given site and prevailing conditions. The mounting brackets may include vibration-dampening supports to reduce the transmission of generated noise into the building.

The structure may be built in modular sections (e.g., from 4 to 20 feet in width and from 2 to 8 feet in diameter.) This may aid installation and allow systems and/or components to be easily and economically mass manufactured, shipped and installed. The units can operate independently (e.g., each independently generates electricity) or, if desired, the units can be mechanically linked together. The mechanical linkage between the units could provide a more economical installation and could reduce the number of alternators/generators, wiring or similar equipment used to produce electricity. The number of modular sections, length or diameter of the turbine(s) can be customized to utilize the full perimeter of a particular building if desired. As pointed out above, the system can be installed on multiple sides of the building to optimize the variations of the seasons and general wind direction.

The exemplary turbine structure described above uses a cylindrical turbine. The cylindrical design of the turbine and horizontal orientation of the turbine may be desirable to make the most efficient use of the concentration of wind coming over the horizontal edge of the roof. It is not necessary, however, to use this type of turbine design, and other embodiments may use propeller-style or other types of turbines, and the turbines may be oriented horizontally, vertically, or otherwise. The diameter, size or other design parameters of the turbines may vary, depending on such factors as the height of the building, strength or variability of the wind, typical weather conditions, the amount of energy required, and so on.

Some of the advantages of the various embodiments of the invention may include its low cost, efficiency and maintainability in comparison to conventional windmills and vertical straight-wing-type turbines. For example, cylindrical-type turbines cannot be effectively employed in ground installations due to the reduced speed of wind next to the ground. When cylindrical-type turbines are deployed vertically (standing up,) they exert tremendous unbalanced forces on their axle bearings. The present system allows the use of cylindrical-type turbines with their axis of rotation parallel to the ground, reducing the stress on the bearings and allowing inexpensive long-life bearings to be employed. Conventional vertical installations also typically require the use of guy wires that anchor the turbine to the ground, increasing the forces on the bearings, and increasing the complexity of the installation. The present system reduces the stress the system and the complexity and expense of the installation. Compared to current methods, the present system reduces the stress caused by vibration from the wind, which in turn reduces the maintenance/expense and the complexity of the installation. The present system is also more efficient and quiet than typical conventional turbine systems because of the use of deflectors and/or parapet walls to reduce the flow of wind against the portion of the turbine that is moving in the direction opposite the wind flow.

When wind blows against the face of a building, the air in contact with the building face is compressed by the force of the moving air behind it. This force, combined with the reflected force from the inertia of the impacting air, causes the air at the building face to move around to either the sides of the building or over the top of the building. Even allowing for increased friction die to laminar flow resistance against the building wall and at the edge of the roof parapet, the air moving over the edge of the parapet is greatly accelerated over the speed of the ambient air (the speed of the wind in the absence of the vertical surfaces of the building or other structure).

Because the wind turbine of the present system is positioned at the edge of the roof, this high-energy moving air drives the turbine, extracting the wind's energy and generating electricity. Although it may be omitted or given a variety of shapes, the concentrator (also called a baffle or augmentor) is used in the preferred embodiment to funnel moving air into the wind turbine. The concentrator allows the device to compensate for placement issues that may make it difficult to place the wind turbine at the point of greatest air flow. The device, its mounts and the concentrator are configured to provide the most advantageous airflow to the wind turbine. The concentrator alters the airflow contour near the edge of the building to prevent moving air from passing up and high over the building, beyond the reach of the wind turbine's blades.

As noted above, the concentrator may include solar-electric panels on its upper surface in order to generate electricity independently of the turbine mechanism. The concentrator may further include mechanical actuators to adjust the position of the concentrator and to thereby improve both the wind-gathering ability and the light-gathering ability of the concentrator. Alternative embodiments may also include an autobraking mechanism to protect the structure from overspeed winds. This mechanism may be implemented using the concentrator, or a separate spoiler which is positioned along the length of the turbine. When overspeed operation is detected (electrically or mechanically) an actuator is activated or a catch is released (electrically or mechanically,) allowing the spoiler to block airflow to the turbine.

In the preferred embodiment, each section contains its own electrical generating mechanism and electronic power management circuitry. In some embodiments, some sections may not have independent electrical power generating capability. They may instead be mechanically coupled to other sections to provide additional mechanical power to another section that has electricity generating equipment. Other segments may incorporate a water pump instead of an electrical generator, to help pump water through the building, or a fresh air system to reduce HVAC costs and force fresh air into the building when the temperatures are correct. In another embodiment a linkage to a ventilator system that will augment electrically-powered air handling systems when the wind is blowing. The mechanical power of the turbines may be harnessed for other purposes as well.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:
    a wind turbine; and
    a deflector;
    wherein the wind turbine is mounted on a roof of a building and positioned to enable the wind turbine to be driven by wind flow which is passively concentrated by a vertical face of the building and flows up and over the edge of the roof;
    wherein the wind turbine comprises a cylindrical turbine structure having an axis about which a plurality of turbine blades rotate, and wherein the wind turbine is oriented with the axis parallel to the edge of the roof;
    wherein the wind turbine is positioned adjacent to a parapet wall extending vertically from the edge of the roof, and wherein the wind turbine is positioned such that the parapet wall screens at least a portion of the wind turbine from the concentrated wind flow, wherein the screened portion of the wind turbine is counter-rotating with respect to the concentrated wind flow wherein the deflector is attached to the parapet wall and configured to further screen the counter-rotating portion of the wind turbine from the concentrated wind flow while allowing the concentrated wind flow to reach a portion of the wind turbine that rotates with the concentrated wind flow.

2. A system comprising:

a wind turbine; and a concentrator;

wherein the wind turbine is mounted on a roof of a building and positioned to enable the wind turbine to be driven by wind flow which is passively concentrated by a vertical face of the building and flows up and over the edge of the roof;

wherein the wind turbine comprises a cylindrical turbine structure having an axis about which a plurality of turbine blades rotate, and wherein the wind turbine is oriented with the axis parallel to the edge of the roof;

wherein the wind turbine is positioned adjacent to a parapet wall extending vertically from the edge of the roof, and wherein the wind turbine is positioned such that the parapet wall screens at least a portion of the wind turbine from the concentrated wind flow, wherein the screened portion of the wind turbine is counter-rotating with respect to the concentrated wind flow wherein the concentrator is positioned on a side of the wind turbine closest to the edge of the roof, wherein the concentrator is configured to be adjustably positioned to redirect wind flow over the edge of the roof to a desired portion of the wind turbine, and wherein the concentrator is configured to be alternately adjustable to at least a first position in which the concentrator concentrates wind flow to the wind turbine and a second position in which the concentrator blocks at least a portion of the wind flow to the wind turbine.

3. A system comprising:

a wind turbine, wherein the wind turbine is mounted on a roof of a building and positioned to enable the wind turbine to be driven by wind flow which is passively concentrated by a vertical face of the building and flows up and over the edge of the roof; and a deflector positioned on a side of the wind turbine opposite the edge of the roof, wherein the deflector is configured to redirect wind flow originating opposite the edge of the roof to a desired portion of the wind turbine.

4. A system comprising:

Two or more wind turbines, wherein each wind turbine is mounted on a roof of a building and positioned to enable the wind turbine to be driven by wind flow which is passively concentrated by corresponding vertical faces of the building and flows up and over corresponding edges of the roof, wherein the wind turbines are positioned at two or more different edges of the roof, and wherein the edges are oriented in different directions.

5. A method comprising:

providing a cylindrical wind turbine having an axis about which a plurality of turbine blades rotate;

mounting the wind turbine on a roof of a building;

positioning the wind turbine at an edge of the roof within wind flow which is passively concentrated by a vertical face of the building and flows up and over the edge of the roof, wherein the wind turbine is positioned with the axis parallel to the edge of the roof;

screening at least a portion of the wind turbine from the concentrated wind flow behind a parapet wall; and positioning a concentrator on a side of the wind turbine closest to the edge of the roof to redirect wind flow over the edge of the roof, wherein the concentrator is alternately positioned in a first position in which the concentrator concentrates wind flow to the wind turbine or a second position in which the concentrator blocks at least a portion of the wind flow to the wind turbine.

6. A method comprising:

providing a wind turbine;

mounting the wind turbine on a roof of a building; and positioning the wind turbine at an edge of the roof within wind flow which is passively concentrated by a vertical face of the building and flows up and over the edge of the roof; and positioning a deflector on a side of the wind turbine opposite the edge of the roof to redirect wind flow originating opposite the edge of the roof to a desired portion of the wind turbine.

* * * * *